Nov. 3, 1970    G. KRACHT ET AL    3,537,131
MACHINE FOR PRODUCING FLEXIBLE FOAM POLYSTYRENE PLASTIC BODIES
Filed Aug. 6, 1968    2 Sheets-Sheet 1

INVENTORS
GERHARD KRACHT
ALVIN M. SASANKO
BY Barthel & Bugbee
ATTORNEYS

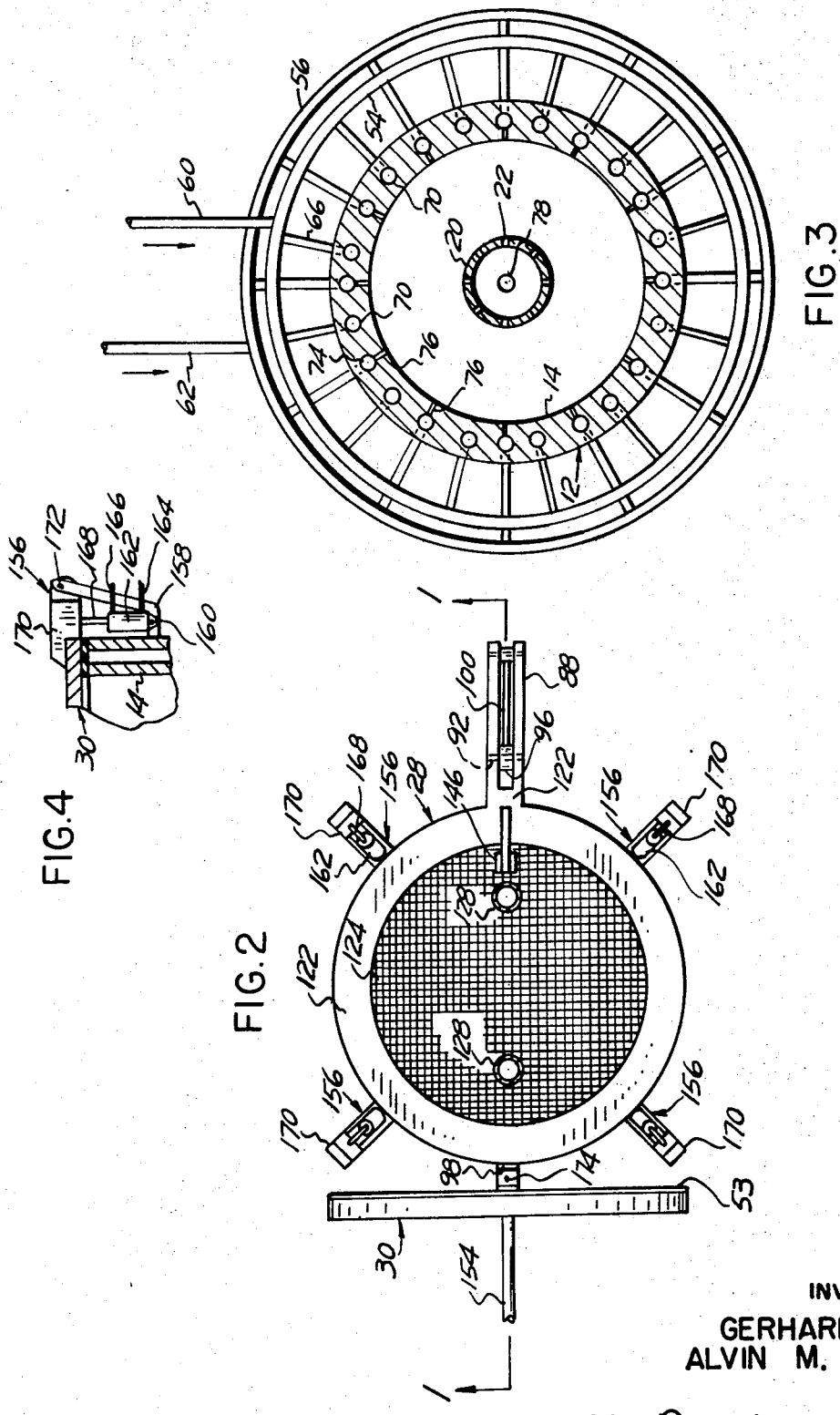

United States Patent Office
3,537,131
Patented Nov. 3, 1970

3,537,131
MACHINE FOR PRODUCING FLEXIBLE FOAM POLYSTYRENE PLASTIC BODIES

Gerhard Kracht, Allen Park, and Alvin M. Sasanko, Taylor, Mich., assignors to Swedish Crucible Steel Company, Detroit, Mich., a corporation of Michigan
Filed Aug. 6, 1968, Ser. No. 750,640
Int. Cl. B29b 5/04
U.S. Cl. 18—5          7 Claims

ABSTRACT OF THE DISCLOSURE

This flexible foam polystyrene plastic molding machine has a hollow-walled casing, preferably of cylindrical shape, with alternate steam and water passageways therein, a hollow perforated central cylindrical core, and an annular vertically-movable bottom raised by hydraulic cylinders. A foraminous filling cover and a solid molding cover are separately hinged to the casing at diametrically opposite locations and alternately raised and lowered by hydraulic cylinders. The filling cover has inlets for a flexible hose which fills the annular mold chamber with foam plastic beads from a storage bin by the air stream from a blower while the molding cover is raised. The filling cover is then raised and the molding cover lowered to close the mold chamber after which clamps operated by hydraulic cylinders move into clamping position above the solid cover to render the mold chamber steam-tight during molding.

---

This process as carried out, for example, by this machine involves first moving the chamber bottom downward to a first level, filling the mold chamber with pre-expanded granules of expansible styrene polymer plastic material, increasing the chamber volume by moving the bottom downward to a second level, admitting steam under pressure into the mold chamber to further expand the plastic granules, then or shortly thereafter moving the bottom of the mold chamber downward to a third level, then upon the attainment of a predetermined pressure in the chamber shutting off the flow of steam and cooling the chamber, opening the top of the chamber while admitting steam, and raising the bottom of the chamber to the first level while continuing the admission of steam below the workpiece to eject the workpiece.

This machine and process produce a molded foam plastic block which is very flexible and can be immediately cut into sheets while still hot or molded with recesses for packing fragile articles without the necessity of crushing the block or sheet to produce or enhance flexibility as hitherto required.

In the drawings,

FIG. 2 is a top plan view, partly in section, taken along the line 2—2 in FIG. 1;

FIG. 3 is a cross-section taken along the line 3—3 in FIG. 1;

FIG. 4 is a fragmentary central vertical section similar to FIG. 1, but with the solid cover closed, and with one of the cover clamps in its closed position.

Figure 1:
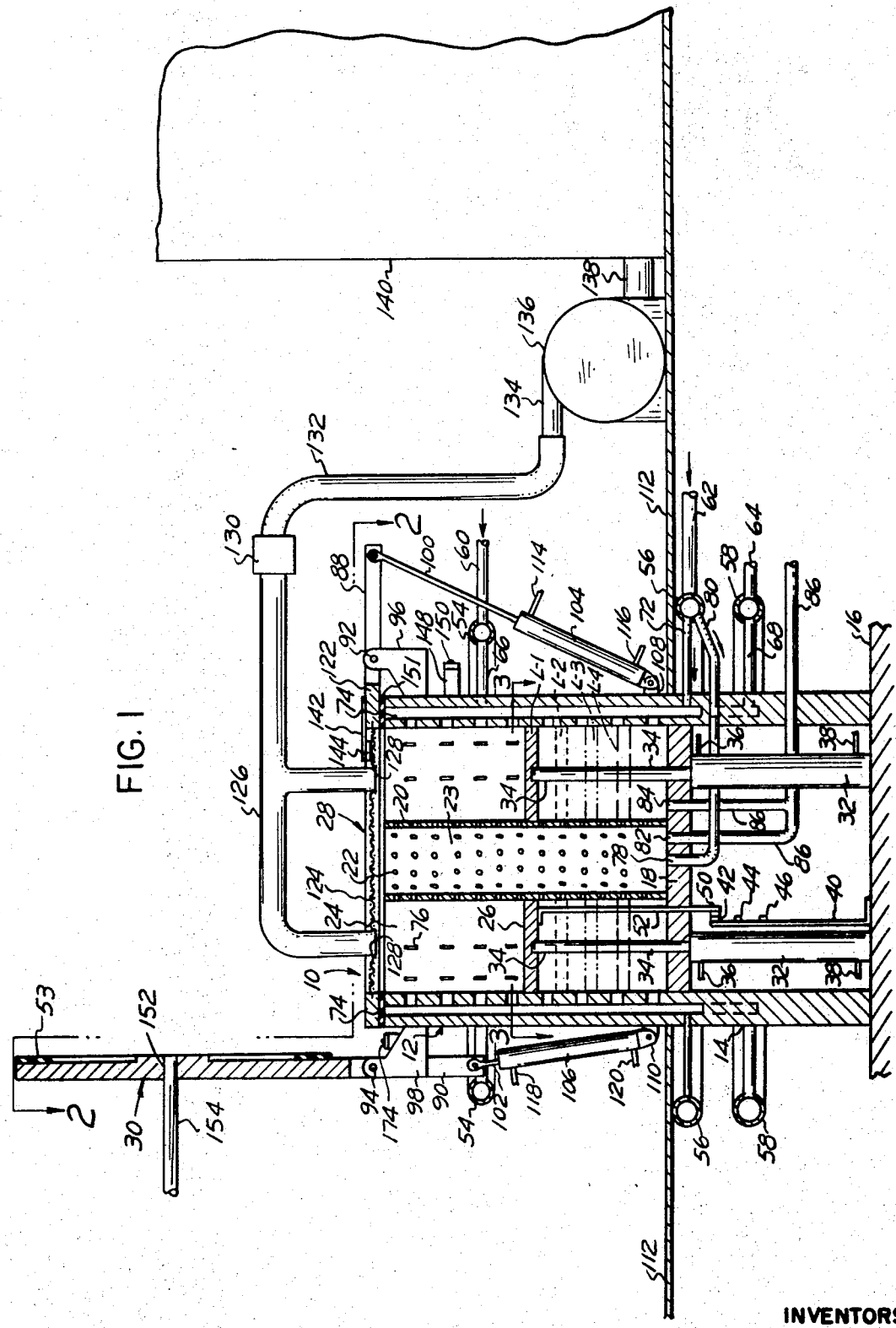
FIG. 1 is a central vertical section through a machine for producing flexible foam polystyrene plastic bodies, according to one form of the invention, taken along the line 1—1 in FIG. 2, with plastic granule feeding means shown in side elevation.

Referring to the drawings in detail, FIGS. 1, 2 and 3 show a flexible foam polystyrene plastic molding machine, generally designated 10, according to one form of the invention as including a hollow-walled casing 12 which for convenience has a preferably hollow cylindrical outer side wall 14 with its lower end resting upon a foundation 16. Partway between its lower and upper ends, the casing 12 is provided with a lower wall 18 upon which rests a hollow preferably cylindrical perforated core 20 contaning a multiplicity of small holes or ports 22 and containing a core chamber 23. Movable vertically within the mold chamber 24 provided between the casing outer wall 14 and core 20 and closed either by a movable filling cover 28 or by a movable molding cover 30 is a movable annular bottom plate 26. The movable bottom plate 26 is raised and lowered by a plurality of hydraulic cylinders 32 with lower ends resting upon the foundation 16, and with vertically-reciprocable pistons or plungers 34 having upper ends threaded into or otherwise secured to the movable bottom 26. The hydraulic cylinders 32 are provided at their upper and lower ends with service pipes 36 and 38 respectively, one of which is used for the admission of hydraulic pressure fluid while the other exhausts fluid from its respective cylinder 32 in order to raise or lower the plungers 34.

Also resting upon and supported by the foundation 16 adjacent one of the hydraulic cylinders 32 is a limit switch bracket 40 upon which are mounted three different bottom-plate-level limit switches 42, 44 and 46 located at three different vertical levels and singly or successively actuated by a switch actuator 50 mounted on an arm 52 which passes upward through the suitably bored lower wall 18 to a connection with the lower side of the bottom plate 26. The limit switches 42, 44 and 46 are connected into an electrical control circuit (not shown) which halts the bottom plate 26 selectively at a first level L–1 corresponding to its solid line position in FIG. 1 and at second and third levels L–2 and L–3 respectively for purposes described more fully in connection with the description of the operation and of the process capable of being carried out by the molding machine 10.

Mounted at different levels outside of and encircling the hollow outer wall 14 of the casing 12 are three manifolds 54, 56 and 58 respectively. The upper manifold 54 is supplied with cooling water from a cooling water inlet pipe 60, the middle manifold 56 is supplied with pressurized steam from a steam supply pipe 62, and the and the lower manifold 58 is provided with a water or drain pipe 64. The cooling water manifold 54 and water outlet or drain manifold 58 are connected respectively by water inlet and water outlet pipes 66 and 68 respectively to the upper and lower portions of vertical circumferentially-spaced cooling water passageways 70 (FIGS. 1 and 3) in the casing outer wall 14. The steam supply manifold 56, on the other hand, is connected by pipes 72 to verticle circumferentially-spaced steam passageways 74 in the casing outer wall 14 and communicate through vertically-spaced steam inlet ports 76 (FIG. 1) with the mold chamber 24. The lower wall 18 is provided with a central steam inlet port 78 from which a core steam supply pipe 80 leads to the steam supply manifold 56. Ports 82 and 84 in the lower wall 18 lead from the core chamber 23 and mold chamber 24 to a branched condensate drain pipe 86 by which condensate is removed from these chambers.

The filling cover 28 and molding cover 30 are mounted on arms 88 and 90 which are pivoted at 92 and 94 respectively to angle brackets 96 and 98 mounted at diametrically-opposite locations on the casing outer wall 14 near the top thereof. The arms 88 and 90 at their opposite ends are pivotally connected to the plungers 100 and 102 of hydraulic cover-operating cylinders 104 and 106 respectively, the lower ends of which are pivotally mounted on brackets 108 and 110 which in turn are secured to the casing outer wall 14 near the level of the floor 112.

The cover-lifting cylinder 104 is provided with upper and lower service ports 114 and 116, whereas the cover-lifting cylinder 106 is similarly provided with service pipes 118 and 120. The filling cover 28 has an annular border member 122 to which is secured a central screen 124 and forming the border for the latter. A branched foam plastic granule supply pipe or filling pipe 126 extends downward at its forward end to filling ports 128 extending through the screen 124 and at its rearward end is coupled at 130 to a flexible hose 132 leading to the outlet conduit 134 of a blower 136, the inlet conduit 138 of which is connected to the lower end of a plastic granule storage bin 140. Also mounted on the border member 122 is a switch arm 142 upon which is mounted a filling limit switch 144 (FIG. 1) projecting downward through an aperture 146 (FIG. 2) in the screen 124. An arm 148 carrying a limit switch 150 is mounted on the casing side wall 14 in the path of the arm 88. An annular sealing gasket 151 of elastic deformable material is secured to the lower surface of the border member 122.

The molding cover 30 has an annular sealing gasket 153 secured to its lower surface and its solid construction is broken by a steam inlet port 152 in the center thereof connected to a steam inlet pipe 154 which in turn is coupled to a flexible steam hose (not shown) leading to the steam supply manifold 56.

In order to hold the solid cover or molding cover 30 firmly down against the top of the casing 12, multiple clamping devices, generally designated 156 (FIG. 2) are provided at circumferentially-spaced locations around the casing 12. Each clamping device 156 (FIG. 4) includes an angle bracket 158 secured to the casing outer wall 14. Near its junction with the wall 18, the angle bracket 158 is provided with a pivotal connection 160 to a hydraulic clamp operating cylinder 162 provided with service pipes 164 and 166 and with a plunger 168, the upper end of which is connected to a clamping jaw 170. The inner end of each clamping jaw 170 engages the top of the molding cover 30 near its periphery, whereas its outer end is pivoted at 172 to the upper end of the angle bracket 158.

In the operation of the invention and in carrying out the process of the invention, let it be assumed that the botom plate 26 is at its uppermost level L–1, which in the machine actually constructed was 48 inches below the top of the casing 12. Let it also be assumed that the clamping devices 156 are open, with their clamping jaws 170 raised. Let it further be assumed that both covers 28 and 30 have been lifted into their vertical positions so that the mold chamber 24 is temporarily open at the top. This is accomplished by admitting hydraulic pressure fluid into the upper service pipes 114 and 118 of the hydraulic cylinders 104 and 106 and discharging hydraulic fluid from the lower service pipes 116 and 120, thereby causing the hydraulic plungers 100 and 102 to move downward to their lowermost positions, and thus swinging the arms 88 and 90 and covers 28 and 30 into their vertical positions. In the machine actually constructed, the various limit switches are connected in an electro-hydraulic circuit containing timing devices such that the various motions of the machine and steps of the process are carried out automatically in timed relationship and in a predetermined sequence. For the sake of simplicity and clarity of disclosure, since the various operations can be carried out under manual control, they are so described herein.

Upon starting the cycle of operations, the bottom plate 26 is caused to travel to its uppermost level L–1, if it is not already at that level. At this first level, the switch actuator 50 engages and closes the uppermost limit switch 42 which in turn engages the electro-hydraulic circuit to supply pressure fluid to the lower service pipe 116 of the hydraulic cylinder 104 and to discharge hydraulic fluid from the upper service pipe 114 thereof. This action causes the hydraulic plunger 100 to move upward, swinging the arm 88 and filling cover 28 counterclockwise around their pivot 92, moving the filling cover 28 into its closed position shown in FIG. 1.

The closing of the filling cover 28 activates the blower 136 which thereupon blows pre-expanded polystyrene plastic beads from the storage bin 140 through the flexible hose 132 and filling pipe 126 into the mold chamber 24. The beads have been pre-expanded in the manner set forth in the Kracht Pat. No. 3,309,440 of Mar. 14, 1967 for Process of Producing Flexible Foam Polystyrene Plastic Sheeting. As the mold chamber 24 becomes filled with the plastic beads, these eventually press against the filling cover 28 and actuate the limit switch 144. This action activates the hydraulic cylinders 32 and cause their plungers 34 to move downward until the switch actuator 50 engages the second limit switch 44 when the bottom plate 26 reaches the second level L–2, temporarily halting its downward travel and creating a void at the top of the change of plastic beads in the mold chamber 24. In the machine as actually constructed, the bottom plate 26 traveled downward five inches during this descent from the first, uppermost or filling level L–1 at 48 inches to the second level L–2 at 53 inches below the top of the mold chamber 24.

The engagement of the switch actuator 50 with the second level limit switch 44 de-energizes the blower 136 and halts the flow of beads, while it energizes the electrical circuit to activate the hydraulic cylinder 104 to admit hydraulic pressure fluid to the upper service pipe 114 and to discharge hydraulic fluid from the lower service pipe 116. Thereupon the filling cover 28 swings upward into its vertical or open position, causing the arm 88 to engage and close the limit switch 150. This action activates the hydraulic cylinder 106 by supplying hydraulic pressure fluid to the lower service pipe 118, thereby causing the plunger 102 thereof to move upward and swing the arm 90 clockwise around its pivot 94 to swing the molding cover 30 downward into closing and sealing engagement with the top of the casing 12.

The closing of the mold cover 30 closes a limit switch 174 which in turn causes activation of the hydraulic cylinders 162 of the clamping devices 156 (FIG. 4) so as to admit hydraulic pressure fluid to their upper service pipes 166 and discharge hydraulic fluid from their lower service pipes 164. As a result, their hydraulic plungers 168 and clamping jaws 170 move downward, clamping the molding cover 30 tightly against the top of the casing 12.

In response to the closing and clamping of the mold cover 30, a pressure-responsive switch (not shown) connected to the hydraulic circuit of the clamping cylinders 162 causes an electric circuit to open a steam valve (not shown) which in turn supplies steam under pressure of approximately 75 pounds per square inch or 5.27 kilograms per square centimeter and 250° F. or 121° C. to flow through the steam manifold 56, pipes 72 and 80 and casing passageways 74 into the mold chamber 24 and core chamber 23 by way of the outer and inner steam inlet ports 76, 78 and 22. The heat from the steam causes the pre-expanded polystyrene plastic beads to expand further. During this steaming and consequent fusion and expansion of the plastic beads or immediately thereafter, the electric circuit again activates the hydraulic cylinder 32 in the manner previously described so as to cause the bottom plate 26 to move still further downward from its second level L–2 to its lowermost level L–3 at 72 inches below the top of the mold chamber 24 in the machine actually constructed, whereupon the switch actuator 50 engages the third limit switch 46, halting the descent of the pistons 34 in the cylinders 32. The voids thus provided at the top and bottom of the mold chamber 24 during fusion and expansion of the plastic beads reduce the density and also impart a more uniform density to the plastic foam produced. The downward motion of the bottom plate 26 during fusion and expansion imparts great flexibility to the molded foam plastic body without the necessity for subsequently crushing it or the plastic sheeting cut or sliced from it.

Upon the attainment of a predetermined pressure within the mold chamber 24 and upon the lapse of a predetermined time period as accomplished by a conventional time switch (not shown), the electric circuit closes the steam supply valve, cutting off the further flow of steam to the steam supply pipe 62 and at the same time opening a cooling water valve (not shown) which supplies cooling water to the cooling water supply pipe 60, cooling water manifold 54 and water inlet pipes 66. At the same time, the electric circuit opens the cooling water outlet pipes 68, water outlet manifold 58 and drain pipe 64, causing cooling water to flow downward through the vertical water passageway 70 in the casing outer wall 14 and cooling the contents of the mold chamber 24.

Upon the expiration of the predetermined cooling time period, the electric circuit activates the clamping devices 156 to admit hydraulic pressure fluid to their lower service pipes 164 and discharge hydraulic fluid from their upper service pipes 166. This action moves their respective plungers 168 upward, swinging the clamping jaws 170 upward around their pivots 172 into their vertical or open positions. Thereupon the electric circuit activates the hydraulic cylinder 106 by admitting hydraulic pressure fluid to the upper service pipe 118 and discharging hydraulic fluid from the lower service pipe 120 to cause the hydraulic plunger 102 to move downward and swing the mold cover 30 in a counterclockwise direction around its pivot 94 upward into its open or vertical position.

The electric circuit now opens the steam valve (not shown) to cause steam to again flow through the steam supply pipes 62, 72 and 80 into the mold chamber 24 to reduce wall friction and consequently to assist the subsequent ejection of the molded foam plastic body. Immediately thereafter the hydraulic cylinders 32 are activated to admit hydraulic pressure fluid to the lower service pipes 38 and discharge hydraulic fluid from the upper service pipes 36, causing the plungers 34 thereof to move the bottom plate 26 upward from the lowermost of third level L-3 to the uppermost or first level L-1, causing the switch actuators 50 to engage the uppermost limit switch 42 and halt the ascent of the bottom plate 26 at its uppermost level L-1. In the meantime, the steam pressure around and beneath the molded foam plastic block or body pushes the block or body out of the mold chamber 24 and ejects it.

In this manner, there is produced a hot foam plastic block or body which is very flexible almost to the point of instability. Material severed from this block is capable of being easily molded by compression or vacuum molding into desired shapes or with recesses of desired shape for receiving fragile articles to protect them during shipment.

As previously stated, the steam supplied ot the mold chamber 24 during the above-described operation is preferably at a pressure of approximately 75 pounds per square inch, and at a temperature of 250° F., and the molded foam plastic body is ejected from the mold chamber 24 while it remains hot at a temperature of from 100° F. to 200° F.

As compared with the above-mentioned "Process of Producing Flexible Foam Polystyrene Plastic Sheeting," set forth in the thus-entitled Kracht Pat. No. 3,309,440 of Mar. 14, 1967, the present process results in a better product possessing much more uniform density throughout, and having enhanced flexibility without requiring subsequent crushing. Moreover, this product can be cut into smaller bodies or sliced into flexible sheeting immediately upon its removal from the mold.

In a modification of the process of the present invention, but using the same apparatus shown in the accompanying drawings, we pre-expand the polystyrene plastic granules or beads from a density of 40 pounds per cubic foot to a greatly reduced density, such as one-half pound per cubic foot. With the bottom plate 26 moved downward to its lowest level L-4, the filling cover 28 is then opened in the previously-described manner and the mold chamber 24 filled with the pre-expanded low density plastic material. The mold cover 30 is closed to its lowest position by the cylinder 106. The hydraulic clamping cylinders 162 are then operated to close the jaws 170 of the clamping devices 156 upon the mold cover 30. The hydraulic cylinders 32 are then operated to cause their plungers 34 to raise the bottom plate 26 to its highest level L-1, namely from a 72-inch depth to a 48-inch depth. This action compresses the plastic material in the mold chamber 24 to approximately three-quarters of a pound per cubic foot. The ejection procedure by means of steam or, in the alternative, by compressed air, is then carried out to eject the thus-compressed expanded foam plastic block or body. The result is a flexible product with greatly improved dimensional stability.

While the invention has been described as using a cored cyclindrical mold to produce a hollow cylindrical foam plastic block or body, for convenience of cutting or peeling sheet foam plastic material therefrom, it will be understood that the invention comprehends the production of rectangular foam plastic blocks using a mold of rectangular cross-section rather than of cylindrical cross-section. The sheets of foam plastic material would then be cut from the rectangular block, such as by the use of a hot cutting wire or wires. Such a rectangular block mold would be provided with a movable bottom plate as in the cylindrical molding machine described herein, and in other respects the construction of the machine and its operation would follow the disclosure set forth above.

I claim:

1. A molding machine for expanding granulated plastic material into a molded foam plastic article of predetermined shape, said machine comprising.
    an open-topped mold casing having a hollow open-centered side wall with heating passageways and cooling passageways disposed therein,
    a vertically-movable bottom wall disposed within the open center of said side wall and defining therewith a mold chamber,
    power-operated means for moving said bottom wall downward and upward to respectively increase and decrease the volume of said mold chamber,
    a filling cover pivotally mounted adjacent the top of said mold casing,
    power-operated means for moving said filling cover into and out of closing relationship with the top opening of said mold casing,
    a mold cover pivotally mounted adjacent the top of said mold casing in circumferentially-spaced relationship with said filling cover,
    power-operated means for moving said mold cover into and out of closing relationship with the top opening of said mold casing in alternating sequence with said filling cover,
    means for supplying a heating fluid to said heating passageways,
    and means for supplying a cooling fluid to said cooling passageways.

2. A molding machine, according to claim 1, wherein said filling cover has a foraminous portion disposed inwardly of the periphery thereof.

3. A molding machine, according to laim 1, wherein said filling cover has a filling opening therein,
    and wherein a pneumatically-operated granulated material filling device is operatively connected to said opening.

4. A molding machine, according to claim 1, wherein a perforated hollow core is disposed within said mold chamber in spaced relationship with said side walls,
    and wherein means is provided for supplying a heating fluid to said core.

5. A molding machine, according to laim 1, wherein said heating and said cooling passageways are disposed in alternating circumferentially-spaced sequence in and around said side wall.

6. A molding machine, according to claim 5, wherein heating fluid ports extend from said heating passageways through said side wall into said mold chamber.

7. A molding machine, according to claim 6, wherein said cooling passageways are sealed off from communication with said mold chamber.

References Cited
UNITED STATES PATENTS

| | | | |
|---|---|---|---|
| 2,339,458 | 1/1944 | Champney | 264—124 |
| 2,744,291 | 5/1956 | Stastny et al. | 264—53 |
| 3,058,162 | 10/1962 | Grabonski | 264—53 |
| 3,163,686 | 12/1964 | Dusel et al. | |
| 3,224,039 | 12/1965 | Kracht. | |
| 3,239,880 | 3/1966 | Oxel. | |

J. SPENCER OVERHOLSER, Primary Examiner

M. O. SUTTON, Assistant Examiner

U.S. Cl. X.R.

18—30; 25—103